United States Patent [19]

Moksnes et al.

[11] Patent Number: 5,316,195
[45] Date of Patent: May 31, 1994

[54] APPARATUS FOR DISPENSING A FLAVORABLE MATERIAL

[75] Inventors: Stephen L. Moksnes, Whitewater; Jayant Sharma, Racine; Ronald D. Olson, West Allis; Ronald S. Tump, Whitewater; James M. Kocher, Fort Atkinson; Terrance J. Pausch, Brookfield, all of Wis.

[73] Assignee: Accurate, Inc., Whitewater, Wis.

[21] Appl. No.: 768,804

[22] Filed: Sep. 30, 1991

[51] Int. Cl.$^5$ .............................................. B67D 5/62
[52] U.S. Cl. ................................. 222/146.6; 222/272; 222/413
[58] Field of Search .............. 62/344; 222/146.6, 181, 222/183, 272, 413

[56] References Cited

U.S. PATENT DOCUMENTS

| | | | |
|---|---|---|---|
| 1,570,031 | 1/1926 | Baldner | 222/413 X |
| 1,570,032 | 1/1926 | Baldner | 222/272 X |
| 1,808,804 | 6/1931 | Baldner et al. | 222/272 X |
| 2,687,830 | 8/1954 | Doering | 222/272 X |
| 3,648,904 | 3/1972 | Teige | 222/413 X |
| 3,874,559 | 4/1975 | Pink | 222/146.6 |
| 4,084,725 | 4/1978 | Buchser | 62/344 X |
| 4,189,063 | 2/1979 | Matthiesen | 222/413 X |
| 4,458,829 | 7/1984 | Greenfield et al. | 222/413 X |
| 4,723,614 | 2/1988 | Lahti | 222/413 |
| 4,964,542 | 10/1990 | Smith | 222/146.6 |
| 5,037,004 | 8/1991 | Katz et al. | 222/146.6 |

FOREIGN PATENT DOCUMENTS 1132539  11/1968  United Kingdom ............ 222/146.6

OTHER PUBLICATIONS

Chronos Richardson Brochure (Loss-in-Weight System).
Ceram Brochure (Dosing Mixing Transfer).
KBIC Booklet (Solid State DC Motor Speed Control).

Primary Examiner—Andres Kashnikow
Assistant Examiner—Kenneth Bomberg
Attorney, Agent, or Firm—Foley & Lardner

[57] ABSTRACT

A material feeder for dispensing batches of material which includes a refrigerated enclosure, a material feeder, a feeder drive arrangement, a scale and a controller. The feeder is housed within the refrigerated enclosure, and is removably coupled to the drive arrangement such that the complete feeder arrangement which is exposed to the material (e.g., foodstuffs such as shredded cheese) may be removed from the enclosure for cleaning at a location separate from the enclosure such as a dishwasher. The scale is connected to a container which catches the material dispensed by the feeder and produces a weight signal such is applied to the control unit. The control unit operates the drive unit which rotates a plurality of feed screws in the feeder at two speeds. In particular, the feed screws are driven at a first speed to dispense material at a high rate until a first weight of material is dispensed into the container, and a second speed is used to rotate the feed screws just prior to obtaining the desired weight in the container. This two speed arrangement prevents undesirably overshooting the desired weight for the material to be dispensed in the container. Upon reaching the set point weight, the drive unit is turned off by the control unit.

5 Claims, 13 Drawing Sheets

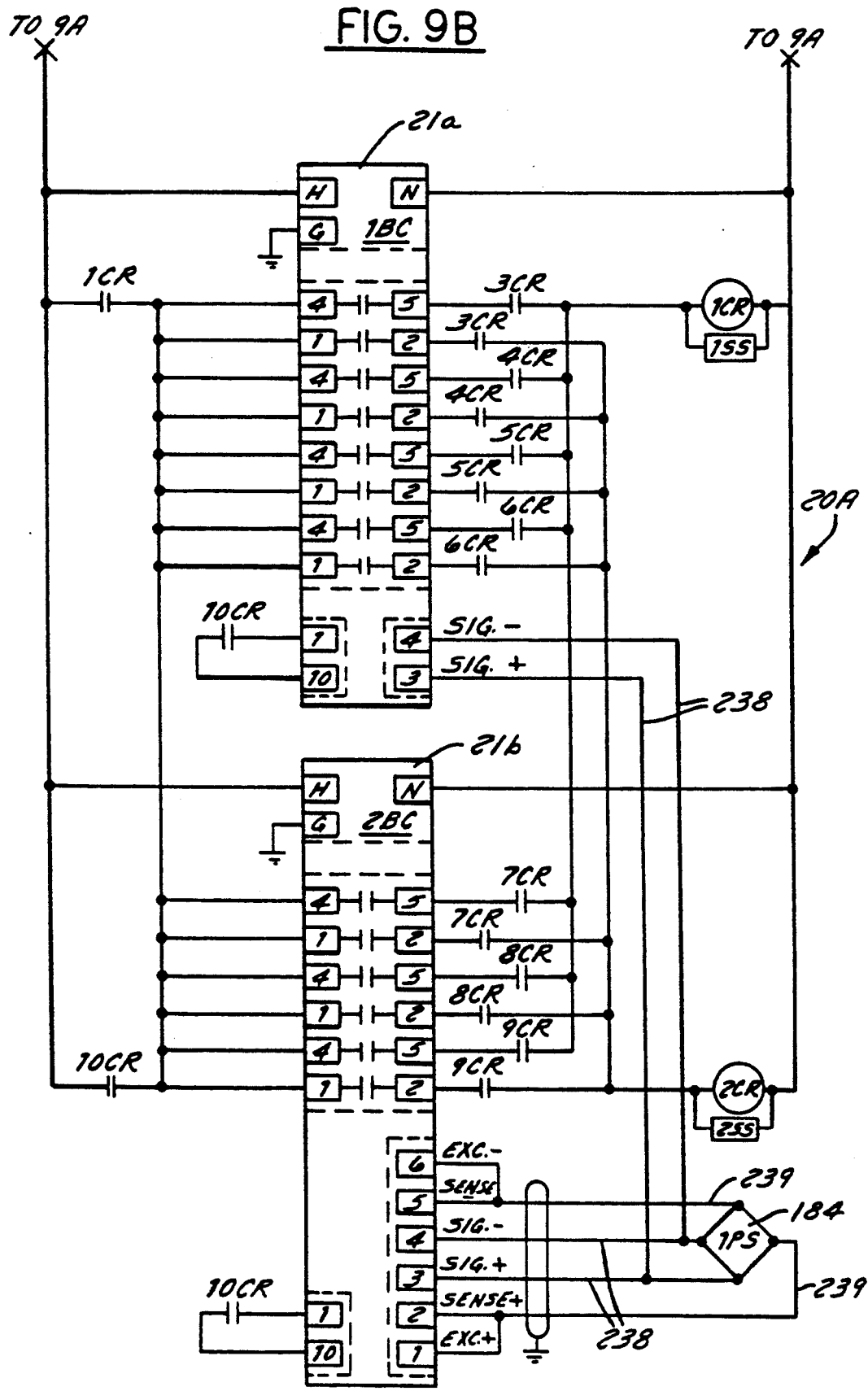

APPARATUS FOR DISPENSING A FLAVORABLE MATERIAL

TECHNOLOGICAL BACKGROUND

The present invention relates to a system for dispensing material in a predetermined batch size. More specifically, the present invention relates to a system including a feeder for dispensing a flowable material such as a foodstuff, where the feeder is housed in a refrigerated enclosure.

BACKGROUND OF THE INVENTION

Referring to U.S. Pat. No. 4,723,614, issued to Arne Lahti on Feb. 9, 1988 (the "614 patent"), this patent describes an apparatus for automatically dispensing weight-controlled portions of granular foodstuff. The '614 patent describes a modular apparatus for dispensing foodstuff in weighted portions. The apparatus includes a housing having an opening for receiving granular foodstuff, a guide for directing foodstuff to a feeder pathway, a removable rotatable feeding screw for advancing food through the feeder pathway to a discharge outlet, and a blocking plate mounted in alignment with the housing outlet for controlling discharge of the foodstuff. In particular, the apparatus is directed to dispensing weighed portions of granular cheeses. The feeder screw discharges the foodstuff into a dosage cup, the weight of which is monitored by an electronic weighing arrangement. When the appropriate amount of foodstuff is directed into the dosage cup, the feeder screw is stopped and the blocking plate is closed.

One problem which occurs in handling certain foodstuffs, such as grated cheese, is the inability to cause the cheese to flow from a hopper holding the cheese into a feed screw associated with the hopper. Referring to the apparatus of the '614 patent, this apparatus includes a rotatable feeder arm intended to effect a uniform flow of foodstuffs from the silo (hopper) to the feeder pathway. The apparatus of the '614 patent also includes a solenoid arrangement for imparting vibratory motion upon the blocking plate which is intended to effect controlled discharge of foodstuff from the apparatus.

Another problem encountered when dispensing foodstuffs is the provision of an effective arrangement and method for keeping the portions of the feeding apparatus in contact with the foodstuff clean. In the apparatus of the '614 patent, the silo is removable to provide access to the interior foodstuff guide and the feeder pathway. Additionally, the feeder screw and blocking plate mechanism are removable to facilitate maintenance and cleaning of the apparatus. However, the '614 patent does not provide for an apparatus which allows all of the elements of the apparatus which contact the foodstuff to be easily removed for cleaning at a location separate from the apparatus. For example, the front, rear and side panels, and guide 30 for directing foodstuffs, are not easily removable from the apparatus of the '614 patent for cleaning at a location separate from the apparatus.

In light of the above discussed problems, it would be advantageous to provide an apparatus capable of feeding foodstuffs which are difficult to handle and perishable, such as grated cheese, which is capable of dispensing the foodstuff material in such a way to avoid bridging of the material in the hopper, destruction of the material, and binding of the material within the feed screw threads. Additionally, it would be advantageous to provide a material feeder where the components of the material feeder exposed to the material are readily removable from the apparatus for cleaning at a location separate from the apparatus. Still further, it would be desirable to provide an apparatus having a configuration where all of the elements of the apparatus in contact with the material, in addition to the material, are refrigerated.

SUMMARY OF THE INVENTION

The present invention provides an apparatus for dispensing a flowable material. One embodiment of the apparatus includes a feeder including a hopper having two substantially parallel, substantially vertical sidewalls, a bottom extending between the sidewalls, first and second feed screws, and means for rotatably supporting the feed screws at one sidewall. The apparatus also includes a feed screw drive mechanically coupled to the first and second feed screws such that the drive is disposed to rotate the feed screws such that the periphery of each feed screw moves away from the bottom when adjacent to the sidewall adjacent the feed screw.

Another embodiment of the apparatus includes a feeder having a first substantially vertical sidewall, a bottom fixed to the sidewall, first and second feed screws, and means for rotatably supporting the feed screws adjacent to the bottom; a feed screw drive mechanically coupled to the feed screws; and an enclosure including a plurality of walls defining an interior space, where the feeder is supported within the interior space. A refrigeration unit is provided to cool the enclosure. The apparatus further includes a drive unit located at the exterior of the enclosure, and means, extending from the exterior to the interior of the enclosure, for removably coupling the feed screw drive to the drive unit, where the drive unit imparts rotational motion to the feed screw drive.

Another embodiment of the apparatus may include a feeder including a hopper for holding the flowable material and a feed screw positioned near the bottom of the hopper for feeding the material out through an outlet opening in the hopper; a thermally insulated enclosure having an interior space containing the feeder; a drive motor disposed outside of the insulated enclosure; and a feed screw drive mechanism for rotating the feed screw in response to actuation of the drive motor, including a coupling for connecting and disconnecting the feed screw from the drive mechanism. The apparatus includes a refrigeration unit disposed to maintain the interior space of the enclosure at a selected temperature.

The present invention further provides an elongated, multi-stage feed screw. The feed screw includes a first stage including a first thread having a first pitch, where the first thread is supported by a center portion. The feed screw also includes a second stage extending from the first stage, the second stage including first and second tine threads having a second pitch greater than the first pitch.

BRIEF DESCRIPTION OF THE DRAWINGS

FIGS. 9A and 9B are ladder diagrams for a first embodiment of a controller useable with the control system;

DETAILED DESCRIPTION OF THE PREFERRED EMBODIMENT

Figure 1:
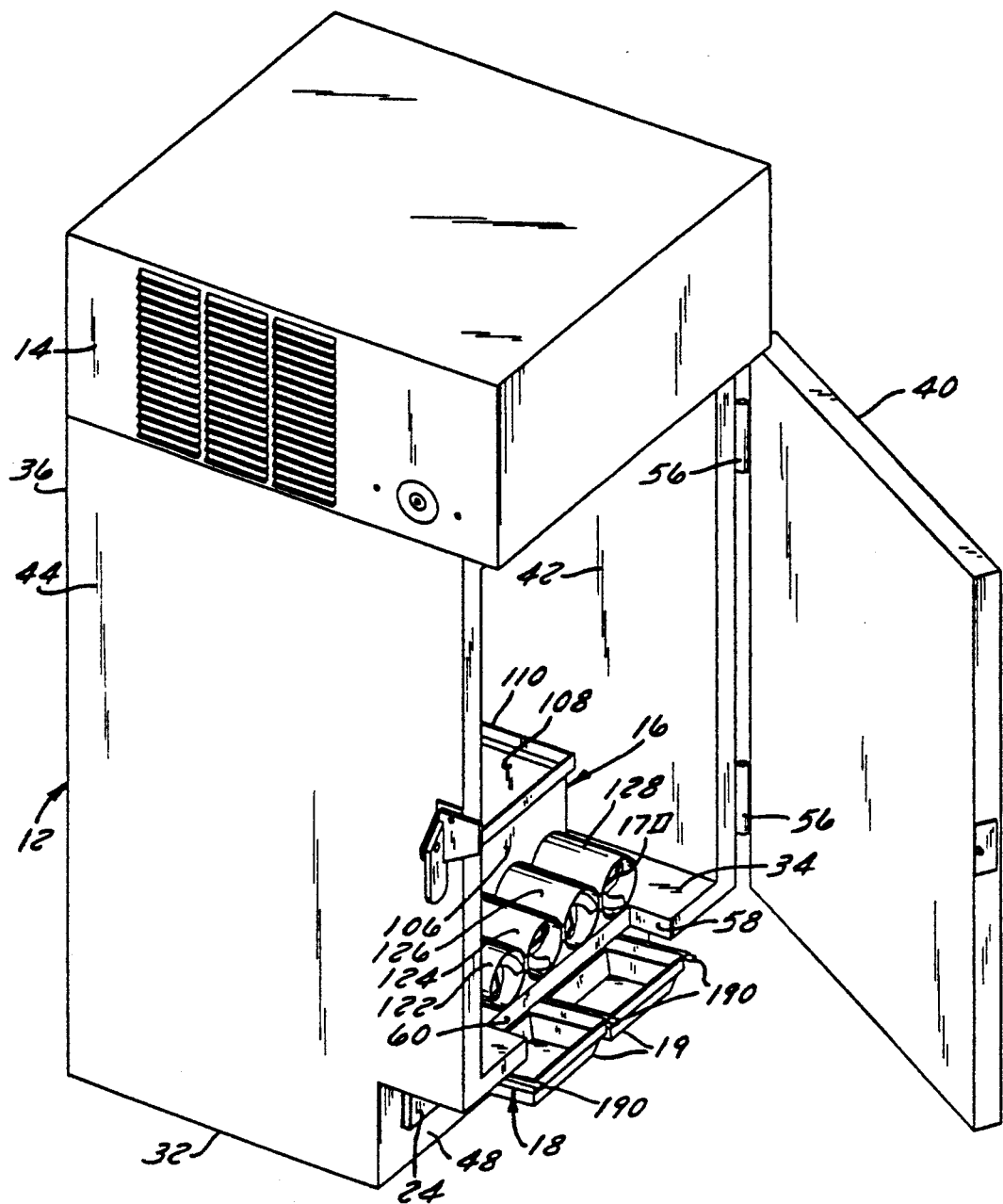
FIG. 1 illustrates a perspective view of a refrigerated material feeder arrangement according to one embodiment of the present invention.
Figure 2:
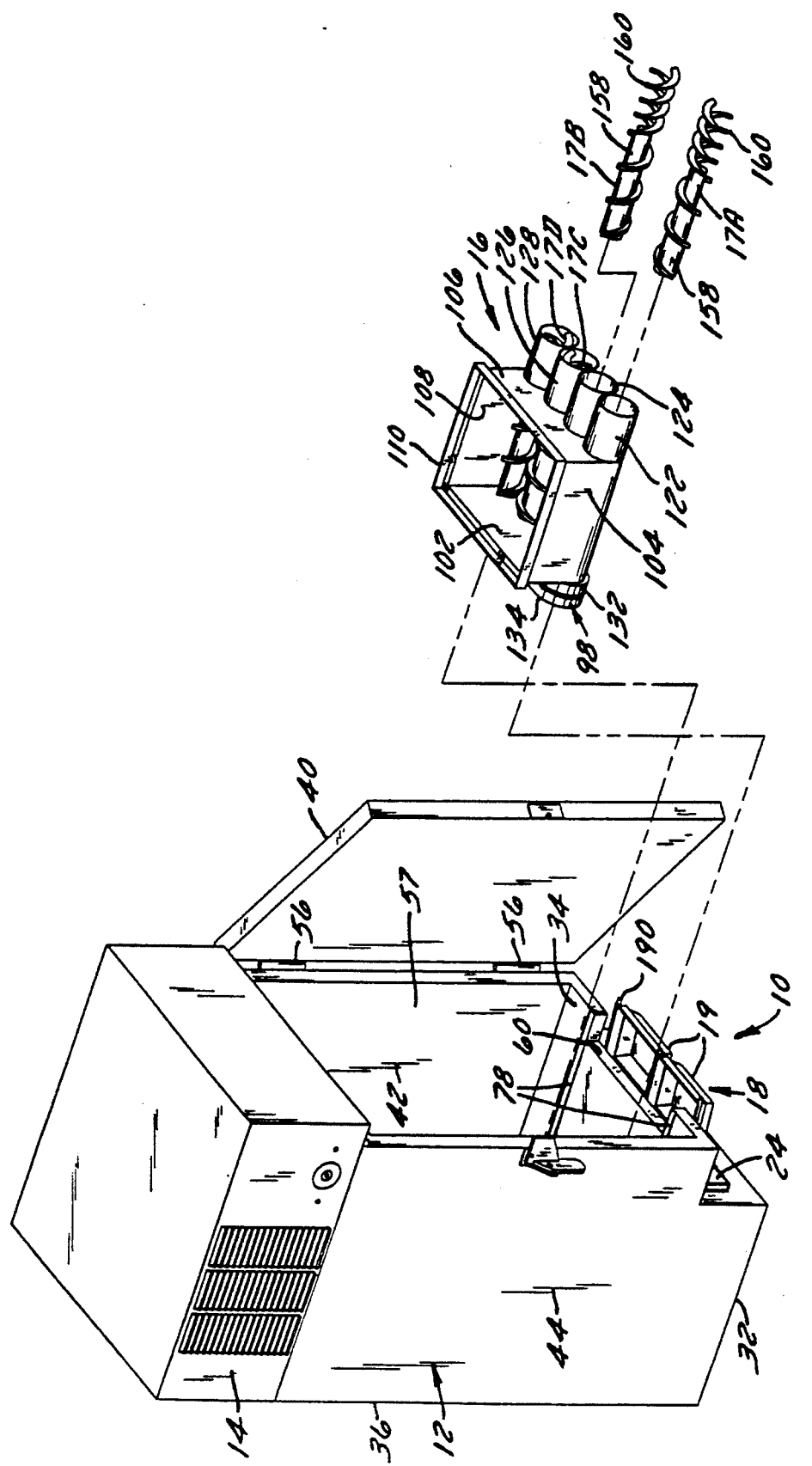
FIG. 2 illustrates an exploded perspective view of the material feeder arrangement illustrated in FIG. 1 with a material feeder removed from a refrigerated enclosure.
Figure 3:
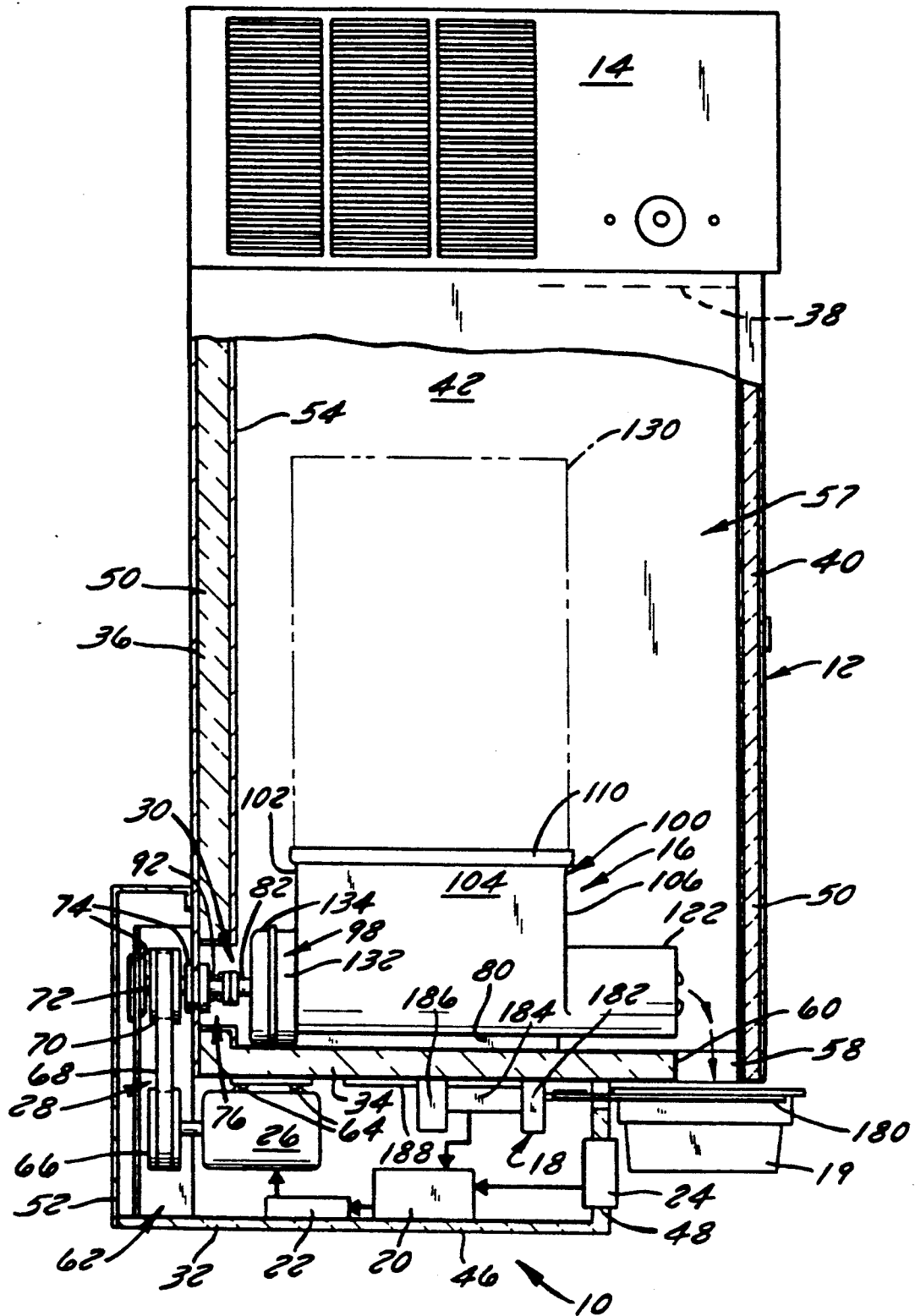
FIG. 3 is a partial side section view illustrating the components of the material feeder illustrated in FIG. 2.

Referring to FIGS. 1-3, a material feeder assembly 10 includes a thermally insulated enclosure 12, a refrigeration unit 14, a material feeder 16, a scale assembly 18, a controller 20, a motor drive unit 22, a function control 24, a motor and gear arrangement 26, a secondary drive 28, and a shaft and coupling assembly 30. In general, assembly 10 operates to dispense a pre-defined amount (weight) of material, such as grated cheese, into a containment arrangement such as a pair of containers 19 supported by scale assembly 18. Feeder 16 includes four feed screws 17A, 17B, 17C and 17D which, when appropriately rotated, distribute material from feeder 16 into containers 19. Based upon a weight signal produced by scale assembly 18 and set point weight values selected at function control 24, controller 20 controls motor drive unit 22 which powers motor and gear arrangement 26 to rotate feed screws 17A-17D via secondary drive 28. More specifically, the user of assembly 10 selects a pre-defined set point weight value for the amount of material to be dispensed into containers 19 by interacting with function control 24. This interaction selects two set point weight values in controller 20, which monitors the weight signal produced at scale assembly 18 in response to the weight of material in containers 19.

Controller 20 operates to provide a first control signal to motor drive unit 22 when the weight in container 19 is below a first weight (below a first set point weight value), provides a second control signal to unit 22 when the weight in container 19 is above the first weight, and applies a stop signal to motor drive unit 22 when the weight in containers 19 exceed a set point weight limit value. The first control signal causes unit 22 to run the arrangement 26 to drive feed screws 17A-17D at a high speed to fill container 19 at a relatively high rate, the second control signal causes unit 22 to reduce the speed of arrangement 26 which slows the speed of feed screws 17A-17D, and, finally, controller causes unit 22 to stop arrangement 26 and feed screws 17A-17D. With this configuration, which is a two-speed assembly for feed screws 17A-17D, a substantially high filling rate can be obtained for containers 19 while also reducing the amount of over-shoot by reducing the speed of screws 17A-17D when the weight in container 19 approaches its set point weight limit value.

Enclosure 12 is an insulated enclosure of conventional form which, by way of example, may be purchased from a manufacturer such as Silver King. Enclosure 12 includes a base support 32, an insulated bottom wall 34, an insulated back wall 36, an insulated top wall 38, an insulated door 40, and a pair of insulated side walls 42 and 44. Base support 32 includes a rectangular bottom panel 46 and a rectangular front panel 48. Bottom panel 46 may be fabricated from sheet metal and bears the weight of assembly 10. Front panel 48 extends upwardly from bottom panel 46 and is fastened to bottom wall 34 at substantially a right angle using an appropriate combination of adhesive, screws or rivets.

Back wall 36, top wall 38, door 40 and side walls 42 and 44 are fabricated in a conventional manner which may include a sheet of insulation sandwiched between sheet metal inner and outer surfaces. An outer sheet metal wall 52 of back wall 36 extends from bottom panel 46 to top wall 38. Wall 52 is fastened to bottom panel 48 in an appropriate manner such as adhering, welding or riveting. An inner sheet metal wall 54 of back wall 36 is fastened to bottom wall 34 and extends up to and is fastened to top wall 38 in an appropriate manner such as adhering, welding or riveting.

Side walls 42 and 44 extend from bottom panel 46 to top wall 38 and are fastened to back wall 36, top wall 38, bottom wall 34, bottom panel 46 and front panel 48 in an appropriate manner such as using an adhesive and/or fasteners between abutting portions of the walls and panels. Door 40 is pivotally mounted to side wall 42 by a pair of hinges 56. When door 40 is closed, walls 36, 38, 42, 44 and door 40 form an insulated enclosure, where the only opening to the exterior is an opening 58 formed by a recess 60, cut in bottom wall 34, which, when door 40 is closed, cooperates with door 40 to form opening 58.

Referring to FIG. 3, insulation 50 of back wall 36 does not completely extend from top wall 38 to bottom panel 46. By limiting the distance which insulation 50 extends toward bottom panel 46, a second enclosure 62 having a configuration as shown in FIG. 3, is formed below, and outside of enclosure 57. Enclosure 62 is formed within the bounds defined by the combination of bottom wall 34, side wall 42, side wall 44, bottom panel 46, front panel 48, insulation 50, metal panel 52 and metal panel 54. Enclosure 62 is un-insulated and includes a ventilation grid (not shown) for allowing cooling air to flow within enclosure 62. Scale assembly 18, controller 20, motor drive unit 22 and arrangement 26, are housed within enclosure 62, where function control 24 is supported by front panel 48 and exposed to the interior of enclosure 62.

Feeder 16, and an associated container 130 from the material being fed, such as grated cheese, are housed within insulated enclosure 57, and kept cool by refrigeration unit 14. Refrigeration unit 14 is mounted upon the top of enclosure 12. More specifically, unit 14 is mounted to top wall 38, and directs cold air into insulated space 57 through an opening in top wall 38 (not shown). By way of example only, refrigerator unit 14 may be of the cold wall type manufactured by Silver King.

As discussed above, motor and gear arrangement 26 rotates feed screws 17A-17D. By way of example, arrangement 26 is fastened to the bottom of wall 34 by appropriate fasteners 64 which may be screws or bolts. Arrangement 26 rotates a pulley 66 of secondary drive 28. Pulley 66 drives a belt 68 which causes a pulley 70 to rotate. Pulley 70 is fastened to a shaft 72 which is supported by inner sheet metal walls 52 and 54 by a pair of appropriately sized ball bearings 74. Half of a clutch or coupling 76 is supported by, and fastened to, the end of shaft 72 opposite to the end of shaft 72 supporting pulley 70. By way of example only, belt 68 may be a timing belt, and pulleys 66 and 70 may be of the type for interacting with a timing belt where pulleys 66 and 70 may or may not include teeth for engaging the timing belt. By way of further example, arrangement 26 may be a ¼ HP, 60 RPM, 90V DC, permanent magnet, gear motor manufactured by M.E.T.

Referring to FIG. 2, bottom wall 34 includes a pair of guide channels (tracks) 78. Channels 78 guide and position feeder 16 by interacting with a pair of rails 80 formed at the bottom of feeder 16 (see FIGURE 3). Channels 78 and rails 80 cooperate to guide feeder 16 into space 57 and also align the halves of coupling 76.

Referring again to coupling 76, the second half of coupling 76 is fixed to a drive shaft 82 of feeder 16. In particular, drive shaft 82 includes a threaded portion 84 which mates with a corresponded threaded opening 86 in the second half of coupling 76. In particular, the first half of coupling 76 includes three drive pins 88 (one shown) which are allowed to translate within openings 90 in the first half. Pins 88 are fixed to a washer 94 arranged about shaft 82 and biased into their associated holes 90 by a compression spring 92. Spring 92 exerts its force between washer 94 and the adjacent bearing 74. The second half of coupling 76 includes three openings 90 arranged to accept pins 88 and allow the first half to positively engage the second half so that shaft 72 may drive shaft 82. Pins 88 are allowed to float within openings 90 so that feeder 16 may be slid into space 57 along channels 78 until both halves of coupling 76 are pressed together.

Without the provision of floating pins 88, the halves of coupling 76 could only be pushed together when pins 88 lined up directly with openings 96. With the assembly of floating pins 88, the halves of coupling 76 may be forced together with pins 88 and openings 96 unaligned. Upon rotation of shaft 72, pins 88 and openings 90 will become aligned due to the relative rotation of shafts 72 and 82, where spring 92 will urge pins 88 into openings 90 upon alignment.

By providing an appropriate rail/channel assembly and coupling assembly, feeder 16 is removable from enclosure 12. More specifically, removable, as used in describing feeder 16, means that the user of assembly 10 may lift and pull feeder 16 out of enclosure 12 without directly disengaging coupling 76. This assembly allows the user to remove feeder 16 and clean it at a location separate from the apparatus, such as a dishwasher or wash tub.

Figure 4:
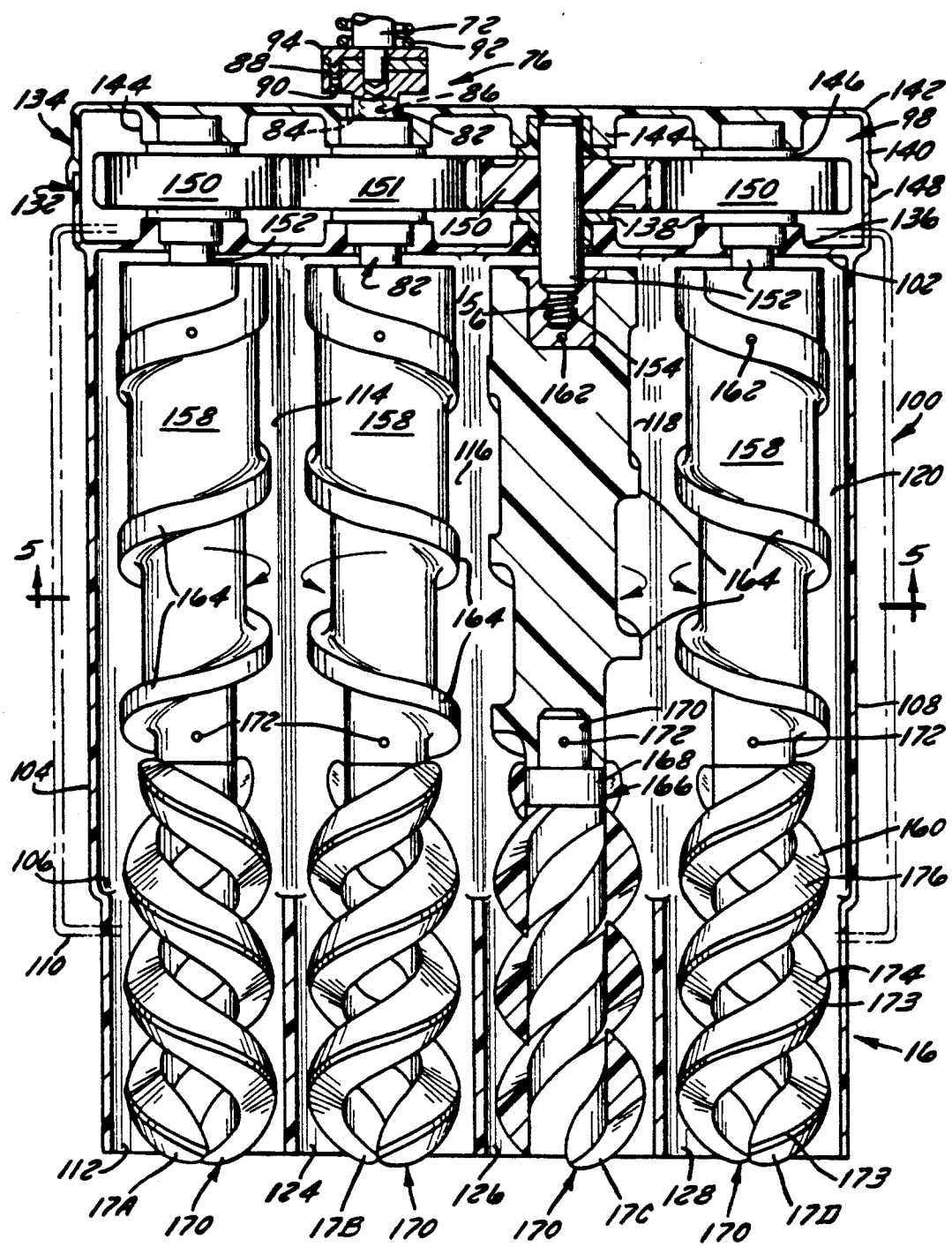
FIG. 4 is a top view of the material feeder partially in section.
Figure 5:
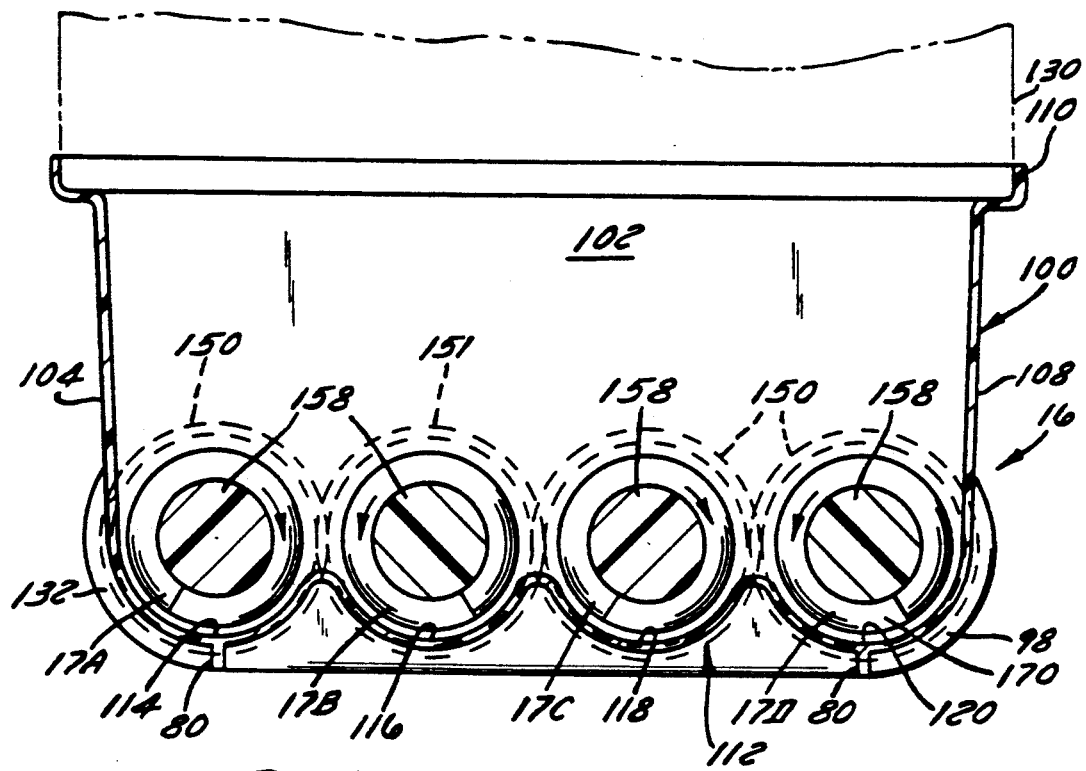
FIG. 5 is an end sectional view of the material feeder taken along line 5—5 in FIG. 4.

Referring now to FIGS. 4 and 5, material feeder 16 includes a screw drive 98 and a substantially rectangular hopper 100. Hopper 100 includes four sides (sidewalls) 102, 104, 106 and 108. Sides 102, 104, 106 and 108 are substantially vertical and arranged at right angles with the sides to which they are adjacent. This arrangement of sides 102, 104, 106 and 108 provides the substantially vertical sides 102, 104, 106 and 108 which prevent material from bridging between sides 102, 104, 106 and 108. Sides 102, 104, 106 and 108 terminate at their tops at a rectangular support shelf 11. Shelf 110 is arranged at the top of sides 102, 104, 106 and 108 to support a container for the material to be fed by feeder 16, such as a box 130 containing shredded cheese (see FIGS. 3 and 5).

Sides 102, 104, 106 and 108 are joined to a bottom 112 spanning the side walls. Bottom 112 includes four parallel, trough-shaped feed screw channels 114, 116, 118 and 120 extending from side 102 to side 106. Hopper 100 also includes four tubular feed screw ducts 122, 124, 126 and 128 extending outwardly from side 106, where the axes of ducts 122, 124, 126 and 128 are parallel with the axes of channels 114, 116, 118 and 120, respectively. Additionally, the bottom portions of ducts 122, 124, 126 and 128 are contiguous with feed screw channels 114, 116, 118 and 120, respectively. Feed screws 17A, 17B, 17C and 17D are disposed in channels 114, 116, 118 and 120, respectively. Additionally, front end portions (second stages 160, see below) of feed screws 17A, 17B, 17C and 17D are partially located within ducts 122, 124, 126 and 128.

By way of modification, sides 102, 104, 106 and 108 could be replaced with a continuous and vertical side wall having, for example, a tubular or other suitable shape. This configuration would eliminate the corners between sides 102, 104, 106 and 108 which may be locations susceptible to material bridging for certain materials.

Referring to FIG. 3, screw drive 98 includes a base 132 and a cover 134. Referring to FIG. 4, base 132 is formed integrally with hopper 100. Base 132 includes four bearing seats 136, each accepting and supporting a bearing 138. Seats 136 are molded into side 102 which is common to hopper 100 and base 132. Side 102 separates the interior of hopper 100 from the interior of screw drive 98. Cover 134 includes a side wall 140 and rear wall 142. Rear wall 142 includes four bearing seats 144 for accepting and supporting bearings 146. In particular, seats 144 and 136 have circular openings which accept the bases of bearings 146 and 138, where the shoulders of bearings 138 and 146 abut the outer edge of seats 136 and 144, respectively. Side Wall 140 of cover 134 is configured to conform with, and engage, a side wall 148 of base 132. Cover 134 may be fastened to base 142 to form a housing for four drive gears 150, 151, bearings 138 and 146, and gear support shafts 152. Cover 134 may be fastened to base 132 by screws (not shown) which pass through portion 134 and have threads which engage openings in portion 132.

Feed screws 17A, 17B, 17C and 17D are driven simultaneously by shaft 82 which is coupled to motor and gear arrangement 26 via secondary drive 28, shaft 72, and coupling 76. Shaft 82 is rotatably supported between base 132 and cover 134 by one pair Of bearings 138 and 146. Shaft 82 is positively engaged with drive gear 151 by a drive pin (not shown) or other conventional manner, such as a spline, or key and keyway assembly. The teeth of drive gear 151 engage the teeth of drive gears 150 associated with feed screws 17A and 17C. All of drive gears 150 are each supported between one pair of bearings 138 and 146 by shafts 152. Gears 150 are positively engaged to shafts 152 by a drive pin, or other appropriate arrangement such as a spline or key and keyway assembly. The teeth of gear 150, associated with feed screw 17D, are engaged with the teeth of gear 150 associated with feed screw 17C. Accordingly, when shaft 82 is rotated counter-clockwise, shaft 152 associated with feed screw 17A is rotated clockwise, shaft 152 associated with feed screw 17C is rotated clockwise, and shaft 152 associated with feed screw 17D is rotated counter-clockwise. In addition to providing rotational motion to feed screws 17A, 17B, 17C and 17D, shafts 82 and 152 rotationally support feed screws 17A, 17B, 17C and 17D at side 102 within associated channels 114, 116, 118 and 120.

Each of shafts 82 and 152 include a threaded end portion 154. Threaded end portions 154 mate with an associated threaded portion 156 in the respective feed screw 17A, 17B, 17C or 17D. Threaded end portions 154 and related portions 156 are threaded with conventional thread configurations. However, depending on the intended direction of rotation for an associated feed screw 17A, 17B, 17C and 17D, the thread may either be right-handed or left-handed. More specifically, feed screws 17A and 17C are intended to have a clockwise rotation. Accordingly, the portions 154 and 156 associated with feed screws 17A and 17C have left-handed threads. Feed screws 17B and 17D are intended to have a counter-clockwise rotation, and portions 154 and 156 associated with feed screws 17B and 17D have right-handed threads.

As discussed above, sidewall 102 separates the interior of hopper 100 with the interior of screw drive 98. To maintain this separation, and prevent the infusion of material from hopper 100 into the interior of screw drive 98, an O-ring may be is positioned about each shaft 82 and 152 where the shaft enters the interior of hopper 100. Of course, the O-ring may be replaced with another type of shaft seal such as a lip seal. The O-rings may be fitted into a groove (not shown) fabricated to position and hold an O-ring about an associated shaft 82 or 150. One of these grooves is molded into each of bearing seats 136 at the location where the shaft 82 or 150 associated with bearing seat 136 enters hopper 100.

By way of example only, hopper 100, including rails 80, base portion 132 and cover portion 134 may be injection molded from a suitable material for handling foodstuffs such as ABS. Gears 150 and 151 may also be molded from a suitable material such as a vinyl designed for gear application, where gears 150 and 151 are lightly lubricated. Shafts 82 and 152 may be fabricated from a suitable steel, but it is preferable to fabricate these shafts from stainless steel since they may be in contact with foodstuffs. Bearings 138 and 146 are bushings fabricated from a material such as vinyl which is suitable for fabricating bearings. The interface between bearings 138 and 146, and shafts 82 and 152, may be provided with a lubricant.

Figure 6:
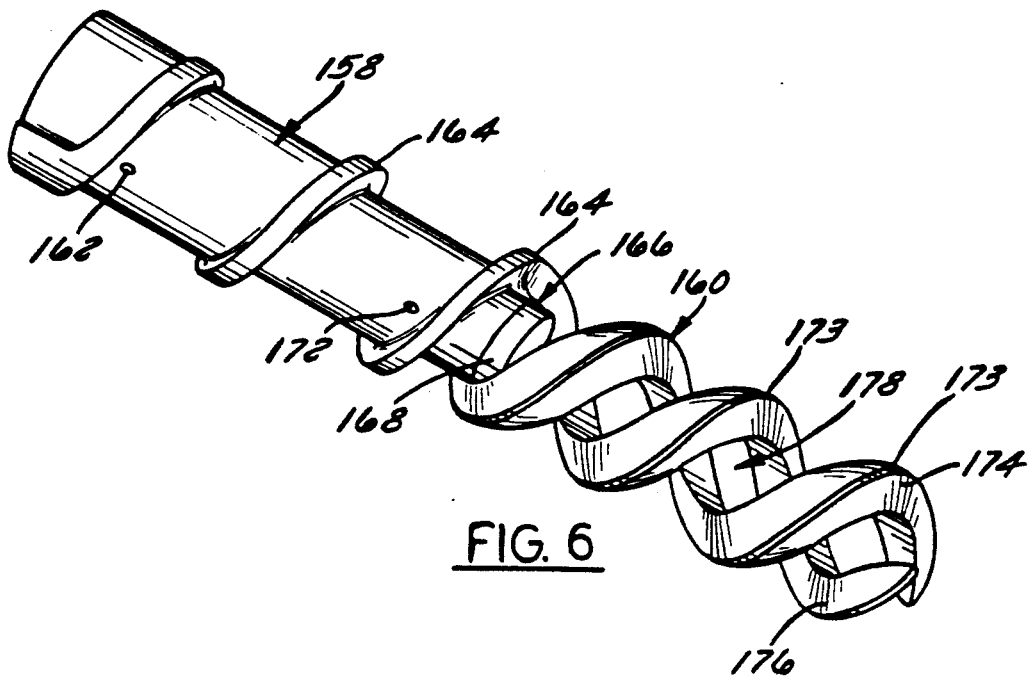
FIG. 6 is a perspective view of the feed screw of FIG. 4.

Referring now to FIGS. 4 and 6, feed screws 17A, 17B, 17C and 17D will be described in detail. The detailed descriptions of feed screws 17A, 17B, 17C and 17D are identical but for their thread configurations. The thread configuration in FIG. 6 is identical to the thread configuration for feed screws 17A and 17C, and the thread configuration for feed screws 17B and 17D are opposite to those for feed screws 17A and 17C. In general, feed screws 17A, 17B, 17C and 17D are multi-stage, variable displacement and variable pitch feed screws. Each of feed screws 17A, 17B, 17C and 17D includes two stages, a first rear stage 158 connected to a second front stage 160.

First stages 158 may be fabricated from a UHMW food grade plastic material, with each including a single relatively blunt (e.g. square or rectangular) thread 164 supported by, and formed upon, a solid center portion 165. Thread 164 has a constant pitch between the rear end including threaded portion 156 and second stage 160. The pitch may be in the range of one times the diameter of thread 164. First stages 158 have a displacement (volume of material which may be located between the feed screw and associated feeder screw channel 114) which increases along the length of stage 158 from portion 156 to stage 160. A thread depth is thus provided for thread 164 which increases along the length of stage 158 from portion 156 to stage 160.

The assembly of thread 164 allows stages 158 to engage material along their length to evenly remove material from hopper 100. More specifically, without the increasing thread depth, material would only be engaged in the area adjacent to wall 102. Threads 164 are provided with a blunt configuration, as opposed to a sharp configuration to avoid damaging material.

Threaded portion 156 is a metal inserted located within an opening in the rear end of center portion 165 and is positively engaged to the first stage 158 with a drive pin 162.

Second stages 160 each include a hub 166 having a shoulder 168. Each hub 166 is inserted within a circular opening 170 at the front end of center portion 165. Hub 166 is positively engaged with first stage 158 by a pin 172 passing through both stage 158 and hub 166. Second stage 160 includes two thread tines 174 and 176 fastened to hub 166. Tines 174 and 176 have a constant pitch extending along their length from hub 166 to their free ends. This pitch may be in the range of one and one-half times the pitch of threads 164. Tines 174 and 176 are supported by hub 166 in a double-helix such that a cylindrical open volume 178 exists between tines 174 and 176. Two tines 174 and 176 are provided in stage 160 to provide more accurate, controllable and consistent material distribution from ducts 122, 124, 126 and 128. The pitch and configuration of tines 174 and 176 is selected such that material may fall between tines 174 and 176, and that the proper amount of material may be moved by tines 174 and 176 to prevent accumulation of material in front of wall 106.

To provide continuity from threads 164 of stages 158 to stage 160, for improved material handling, 176 continues from the end of one thread 164. Thus, each feed screw 17A, 17B, 17C and 17D has one continuous thread along its length made up of thread 164 and tine 176. Referring more specifically to tines 174 and 176, these tines may be fabricated to include only a center portion 173, or may be made relatively blunt to avoid material damage. Tines 174 and 176 may have a substantially polygonal, especially triangular, cross-section, which may, by way of example only, be equilateral, where one side of the equilateral configuration lies upon a cylinder which defines open volume 178 within tines 174 and 176, and one corner of the triangle comprises the outer periphery of tines 174 and 176, providing two diverging sloped sides (faces) for feeding the material. Of course, another cross-sectional shape may be selected based upon material handling constraints or feed screw manufacturing constraints.

Hub 166 and center portions 173 of tines 174 and 176 may be fabricated from stainless steel. Center portions 173 may be fabricated into a helix from a flat stainless steel strip. Typically, stainless steel portions 173 will be used alone to form tines 174 and 176. However, under certain circumstances it may be advantageous to provide the triangular cross-section of tines 174 and 176, where the center portions 173 are built up with a plastic material suitable for handling foodstuffs. More specifically, it may be advantageous to provide tines 174 and 176 with a broader cross-section (e.g. triangular) where tines 174 and 176 are molded from a plastic material and center portions 173 are removed. The cross-section would be configured to provide appropriate rigidity and a shape which is readily molded.

In an alternate embodiment of feed screws 17A, 17B, 17C and 17D, these feed screws may be fabricated completely from a single material. For example, the two stages 158 and 168 of feed screws 17A-17D may be fabricated as a single component from a molded vinyl suitable for handling foodstuffs or other material the arrangement 10 is intended to dispense. Feed screws 17A-17D could also be machined from a single piece of material such as stainless steel. When feed screws 17A, 17B, 17C and 17D are appropriately connected to shafts 82 and 152, these feed screws are located in feed screw ducts 122, 124, 126 and 128.

Referring to FIG. 5, the rotation of feed screws 17A, 17B, 17C and 17D will now be discussed. As discussed above, feed screws 17A and 17C rotate in a clockwise direction, and feed screws 17B and 17D rotate in a counter-clockwise direction. For materials which are difficult to handle, such as shredded cheese, this rotation provides a way to move the material from the interior of hopper 100 through ducts 122, 124, 126 and 128 and into containers 19 while reducing degradation of a material such as shredded cheese and avoiding bridging of the material within hopper 100. More specifically, by rotating feed screw 17A in a counter-clockwise direction and feed screw 17D in a clockwise direction, the periphery of each feed screw moves away from bottom 112 when adjacent to respective sides 104 and 108. This rotation prevents material from becoming wedged between feed screws 17A and 17D and their associated side walls 104 and 108. By rotating feed screw 17A in a clockwise direction, material at side 104 is moved upwardly and toward the center of hopper 100 into the thread of feed screw 17B. The counter-clockwise rotation of feed screw 17D operates in a similar fashion to move material into the threads of feed screw 17C.

To prevent undesirable accumulation of material between feed screws 17A, 17B, 17C and 17D and bottom 112, bottom 112 is configured to include feed screw channels 114, 116, 118 and 120, which substantially conform to a portion of the periphery of their associated feed screws, with a slight clearance as illustrated in FIG. 5. To prevent accumulation of material between adjacent feed screws, the threads of adjacent feed screws may loosely engage each other.

As discussed above, in reference to the rotational direction of feed screws 17A, 17B, 17C and 17D, bridging of a material, such as shredded cheese, in hopper 100 should be avoided. Accordingly, sides 102, 104, 106 and 108, especially just sides 104 and 108, are substantially vertical with respect to bottom 112. However, sides 102, 104, 106 and 108 which are not exactly vertical may be angled inwardly or outwardly (substantially vertical) from the interior of hopper 100 at an angle which prevents bridging of material resting within hopper 100. Additionally, the flow of a difficult to handle material, may be improved by changing the materials from which hopper 100 and feed screws 17A, 17B, 17C and 17D are fabricated. Accordingly, while ABS, vinyl and stainless steel are suggested materials, these materials may be replaced by materials such as Teflon better suited for reducing friction or sticking between the handled material and the components of material feeder 16.

Figure 7:
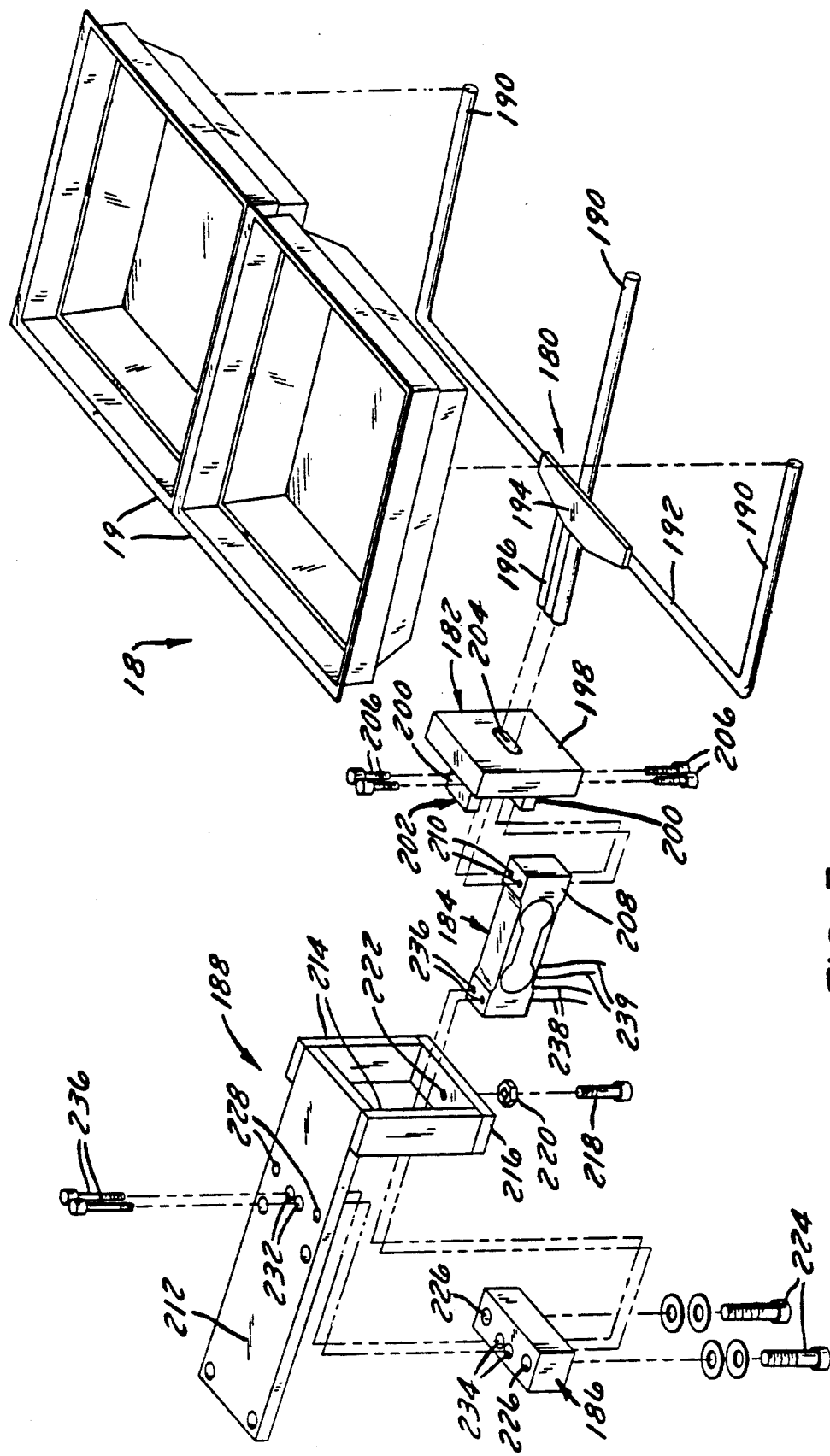
FIG. 7 is an exploded perspective view of a scale assembly according to one embodiment of the present invention.

Referring to FIG. 7, scale assembly 18 includes a container support 180, a support mount 182, a load cell 184, a load cell mounting block 186, and a load cell support 188. Container support 180 has a fork shape, including three prongs 190 extending at right angles from a main beam 192. By way of example, support 180 may be fabricated from three pieces of stainless steel rod, where a first steel rod forms center prong 190, a second steel rod forms one prong 190 and the associated half of beam 192, and a third steel rod forms one prong 190 and the associated half of beam 192. The three rod portions are welded together and welded to a stiffening plate 194 to form a mechanical connector 196.

Support mount 182 includes a rectangular plate 198 and two rear rectangular flanges 200. Plate 198 and flanges 200 may be fabricated from steel and welded together such that flanges 200 are welded to the back surface of plate 198 at right angles to plate 198 to form a channel 202. Plate 198 includes a slot 204 configured to accept connector 196 such that when connector 196 is located within receptacle 204, container support 180 is not permitted to rotate relative to plate 198 along any of its axes. Flanges 200 each include two holes (not shown) which each accept a fastener 206 such as a bolt. Channel 202 is sized to accept a first front end 208 of load cell 184. Mount 182 is fastened to load cell 184 by inserting first end 208 into channel 202 and inserting fasteners (bolts) 206 into the appropriate openings in flanges 200 and openings 210 in load cell 108.

Load cell support 188 includes a base plate 212 which is fastened to bottom wall 34 of enclosure 12 as illustrated in FIG. 3. Support 188 also includes a pair of side plates 214 extending from the front of base plate 212 down to a stop plate 216. Plates 212, 214 and 216 may be of steel construction and welded together. The arrangement of plate 212, members 214 and plate 216 provides a receptacle for rectangular plate 198, which permits restricted vertical movement of plate 198 when load cell 184 is deflected as a result of a load being applied to container support 180. More specifically, a stop screw 218 and associated jam nut 220 are engaged with a threaded hole 222 to limit the downward movement of plate 198 to prevent damage to load cell 184. The receptacle also limits side-to-side movement of plate 198 to prevent damage to load cell 184.

A load cell mounting block 186 is fastened to the bottom surface of base plate 212 by a pair of bolts 224 which pass through holes 226 in block 186 and engage threaded holes 228 in plate 212. Load cell 184 is fastened to the bottom of block 186 by a pair of bolts 230 which pass through a pair of openings 232 in plate 212, a pair of openings 234 in block 186, and are threaded into a pair of threaded holes 236 in load cell 184.

Containers 19 are supported between prongs 190 of container support 180. Thus, when material is fed into containers 19, the weight of this material is transferred as a force from container support 180 to load cell 184 via support mount 182. This force stresses load cell 184 such that load cell 184 provides a voltage value between a pair of leads 238 extending from load cell 184. Load cell 184 also includes a pair of leads 239 to which a current is applied by controller 20 as discussed in detail below. By way of example, load cell 184 may be of the type having Model No. C2G1 manufactured by BLH.

Figure 8:
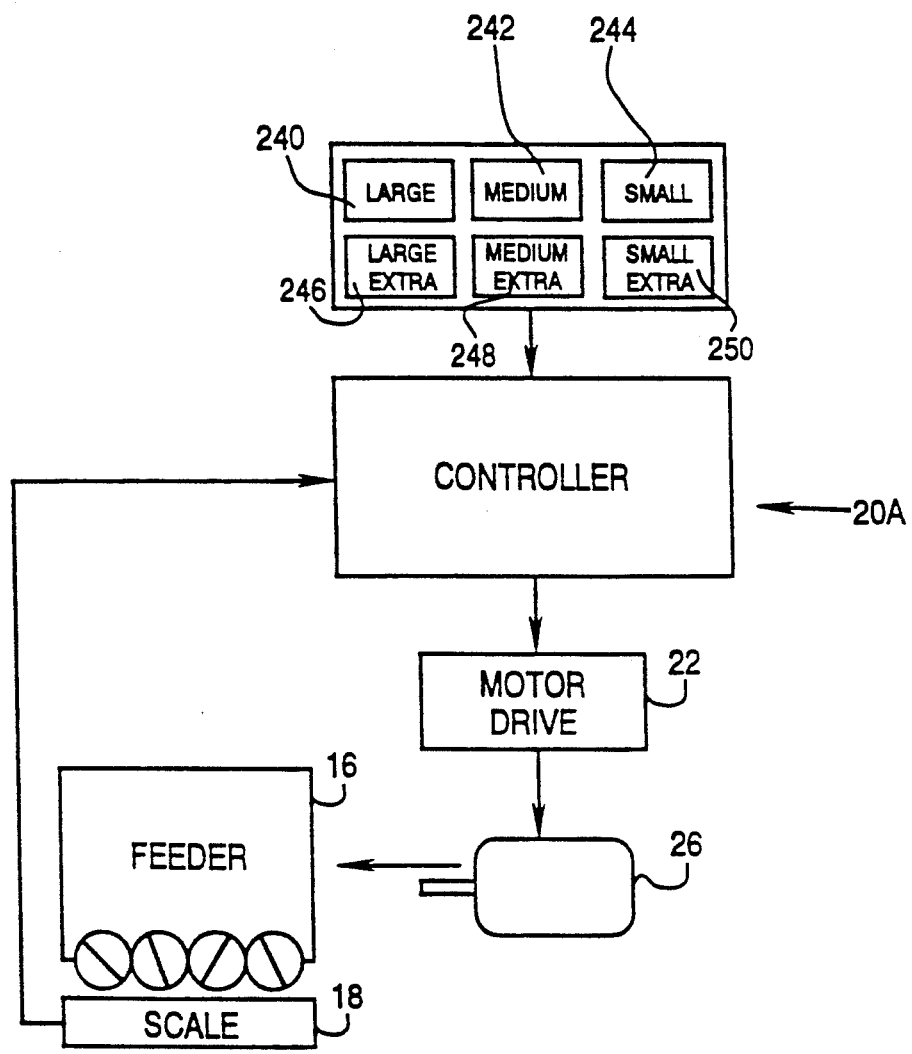
FIG. 8 is a block diagram of a control system for controlling the material feeder arrangement according to one embodiment of the present invention.

FIG. 8 illustrates a block diagram of the control arrangement for the material feeder 16. As discussed above, this arrangement includes controller 20, motor drive unit 22, function control 24, motor and gear arrangement 26, and scale assembly 18. Function control 24 may be a key pad of the type having Model No. 2014942 manufactured by Brady/XYMOX. Motor drive unit 22 may be a solid state DC motor speed control of the type having Model No. KBIC19 manufactured by KB Electronics, Inc. Controller 20 may take two forms; the first being a relay logic form (20A); or a programmed microprocessor based controller (20B).

In general, controller 20 receives feedback from scale assembly 18, where the feedback is used to control motor drive unit 22 which powers arrangement 26 which drives feed screws 17A-17D of feeder 16. The feedback signal provided by scale assembly 18 to controller 20 is a voltage signal developed between leads 238 of load cell 184. This voltage signal is related to the weight of material (shredded cheese) in containers 19, and is produced as a result of applying a current to leads 239. The change in resistance in load cell 184 causes a change in voltage between leads 238. Load cell 184 is preferably configured such that the voltage across leads 238 is proportional to the weight in containers 19.

In addition to the input (feedback) provided to controller 20 by scale 18, set point weight values stored in controller 20 are selected with the pushbuttons (keys) of function control 24. By way of example only, six different weight values are selectable from key pad 24 (i.e., large (key 240), medium (key 242), small (key 244), large extra (key 246), medium extra (key 248), small extra (key 250)). The actual values associated with the depression of keys 240-250 may be altered within the memory of controller 20 by operating the FUNCI key of control 24 with controller 20B.

Based upon the set point weight value selected with control 24 and the feedback from scale 18, controller 20 applies a control voltage to motor drive unit 22. Unit 22 applies a DC voltage to motor 26, which drives motor and gear arrangement 26 at a speed appropriate to drive feed screws 17A-17D.

In a first embodiment of controller 20 (hereinafter controller 20A), controller 20A may be a relay logic, set point controller of the type including two Proweight batch controllers 21a and 21b manufactured by Hardy Instruments. This controller applies a voltage between 0 and 5 volts to motor drive unit 22, which in turn applies a related voltage between 0 and 90 volts, to motor and gear arrangement 26.

Figure 9A:
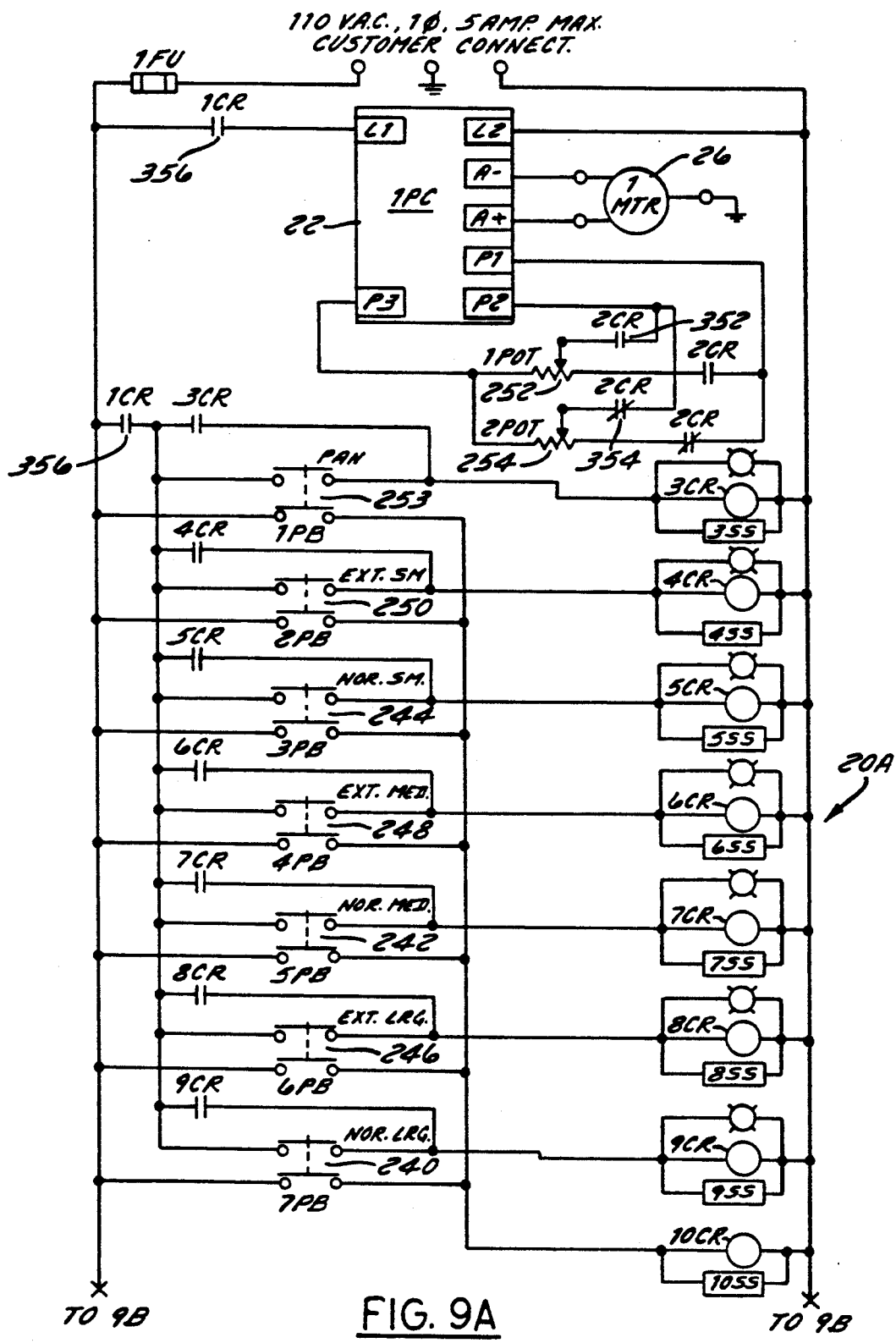

FIGS. 9A and 9B illustrate the ladder diagram for controller 20A as wired to unit 22, arrangement 26, keys 240-250 and 253, and load cell 184. Controller 20A includes a pair of potentiometers 252 and 254 which provide adjustment (biasing) for the voltage applied to unit 22 by controller 20A. More specifically, potentiometer 254 is associated with the voltage applied to unit 22 for driving arrangement 26 at a high speed, and potentiometer 252 is associated with the voltage applied to unit 22 for driving arrangement 26 at a slow speed. Accordingly, by adjusting potentiometer 254, the high speed is adjusted, and by adjusting potentiometer 252, the slow speed is adjusted.

As discussed above, two Proweight controllers 21 are included in controller 20A. Controllers 21a and 21b are used to provide six key inputs (i.e., keys 240-250 and additional keys as required, e.g. key 253, not shown, on control 24). Of course, the number of controllers 21a and 21b may range from 1 to N depending upon the application.

As discussed above, keys 240-250 are each associated with slow and stop set point weight values stored in the associated controllers 21a and 21b. The slow set point weight value is associated with a slow feed screw speed and the stop set point weight value is associated with the final weight desired for the material in containers 19. These weight values may be set by connecting the appropriate interface unit to controllers 21a and 21b and changing the set points as explained by the controller manufacturer. Additionally, controllers 21a and 21b may be calibrated when connected to the appropriate interface as explained by the manufacturer.

Leads 238 and 239 of load cell 184 are connected to controllers 21a and 21b. In particular, leads 238 are connected to controller 21b such that controllers 21a and 21b monitor the voltage value at load cell 184, where the voltage value represents the weight of material in containers 19. Leads 239 are connected to controller 21b. Leads 239 provide current from controller 21b at a certain voltage, where this certain voltage is monitored to allow controller 21b to compensate for voltage losses in leads 238 and 239.

Figure 10:
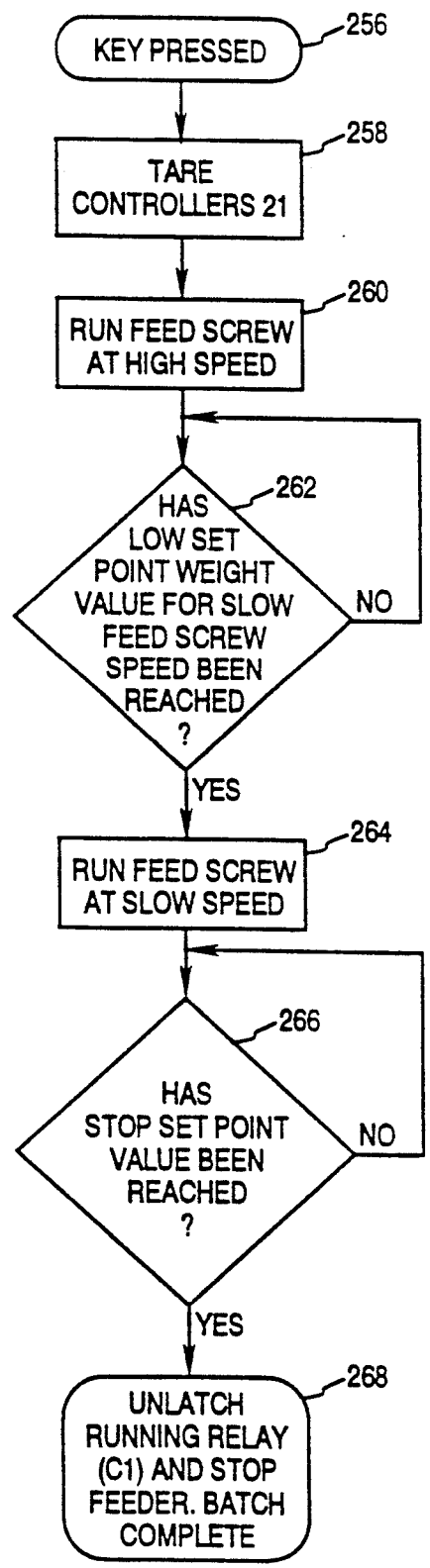
FIG. 10 is a flow chart generally illustrating the sequence of steps carried out by the first embodiment of the controller.

FIG. 10 is a flow chart generally illustrating the sequence of steps taken when a key 240-250 is depressed. In step 256 a key is depressed. In response, contacts 1CR and 10CR are closed such that controllers 21a and 21b sample the voltage weight value from load cell 184 (step 258) and feed screws 17A-17D at the high speed (step 260). In step 258, the voltage weight value is stored as a tare weight.

At step 262, controllers 21a and 21b continuously sample and compare the weight value from load cell 184 with the sum of the slow set point weight value and the tare weight value. When the weight value from load cell 184 exceeds the sum, normally closed contacts 354 are opened and normally open contacts 352 are closed to lower the control voltage to unit 26. Subsequently, unit 22 drives arrangement 26 and feed screws 17A-17D at the slow speed (step 264).

At step 266, controllers 21a and 21b continuously sample and compare the weight value from load cell 184 with the sum of the stop set point weight value and the tare weight value. When the weight value from load cell exceeds the sum, contacts 356 are opened (step 268). Subsequently, unit 22 terminates the supply of power to arrangement 26 and feed screws 17A-17D.

Using the high and low speed arrangement discussed above, the range of weight values over which feed screws 17A-17D are run at slow speed may be adjusted. This may be done to optimize batch feeding speeds while reducing the amount the desired weight to be dispensed into containers may be overshot.

Figure 11:
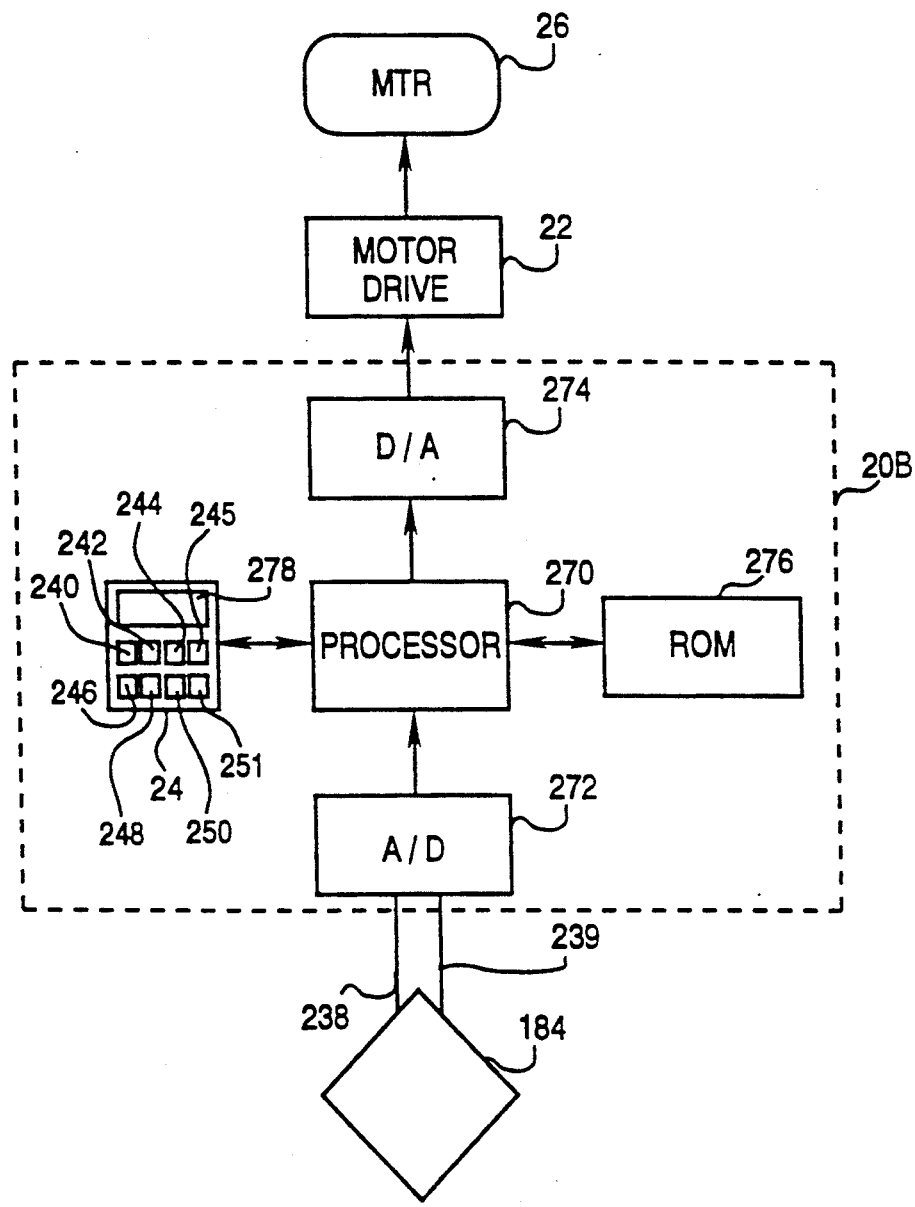
FIG. 11 is a schematic diagram of a second embodiment of the controller useable with the control system.

FIG. 11 illustrates the block diagram for a second embodiment of controller 20 (hereinafter controller 20B). Controller 20B includes a processor 270, an analog-to-digital converter 272 with appropriate gain, a digital-to-analog converter 274 with appropriate isolation, a ROM 276 such as EEPROM, and a version of function control 24 including an LCD 278. The components of controller 20B are coupled with the appropriate interfacing to properly channel analog and digital data between the components. An appropriate power supply is provided to controller 20B to power the various components. By way of example only, processor 270 may be a Motorola 68705.

As with controller 20A, keys 240-250 are each associated with slow and stop set point values, where these set point values are stored in EEPROM 276. In addition, controller 20B also interfaces with a FUNC1 key 245 and a FUNC2 key 251. Processor 270 may be programmed to interface with EEPROM 276 and FUNC1 key 245 to permit a user of arrangement 10 to set and change the slow and stop set point values associated with each of keys 240-250. Processor 270 may also be programmed to interface with EEPROM 276 and FUNC2 key 251 to allow a user to store calibration values associated with load cell 184 in EEPROM 276.

Leads 238 and 239 of load cell 184 are connected to analog-to-digital converter (A/D) 272. In particular, leads 238 are connected to A/D 272 such that A/D 272 monitors the voltage value at load cell 184, where the voltage value represents the weight of material in containers 19. Leads 239 are connected to a current source associated with A/D 272. The current source operates at a voltage which is monitored by A/D 272 to compensate for voltage losses in leads 238 and 239.

Digital-to-analog converter (D/A) 274 is driven by processor 270, and is configured to output between 0 and 10 volts to motor drive unit 22. Unit 22 controls motor and gear arrangement 26 as described above in reference to controller 20A.

LCD display 278 is driven by a display driver of processor 270, to display information such as command prompts, e.g. "PRESS MOD SIZE", "PRESS SIZE", "PRESS SIZE (FAST)", "PRESS SIZE (MODIFY)".

Figure 12A:
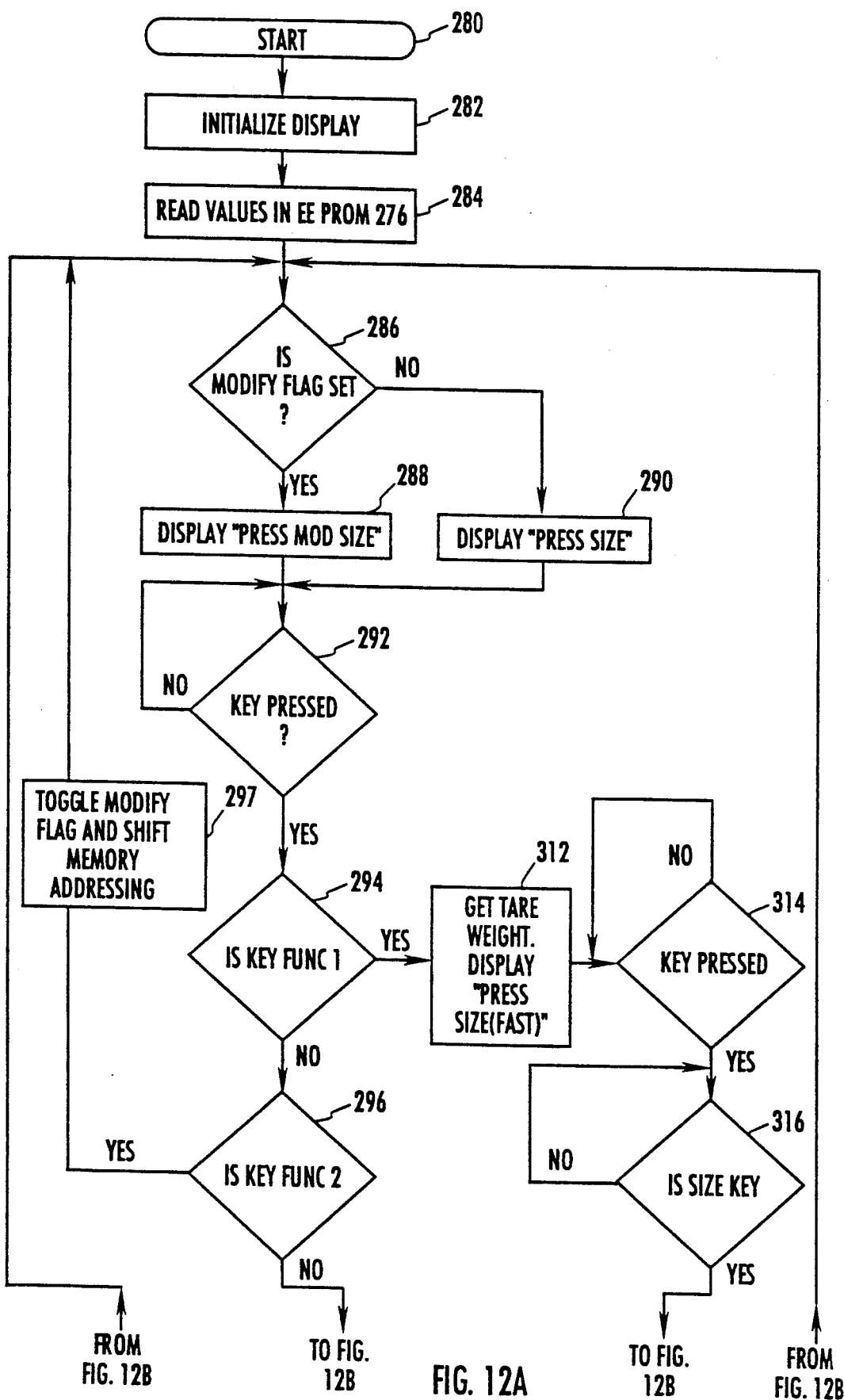
FIGS. 12A and 12B represent, which includes sheets 12 and 12B, a flow chart illustrating the sequence of program steps carried out by the second embodiment of the controller.
Figure 12B:
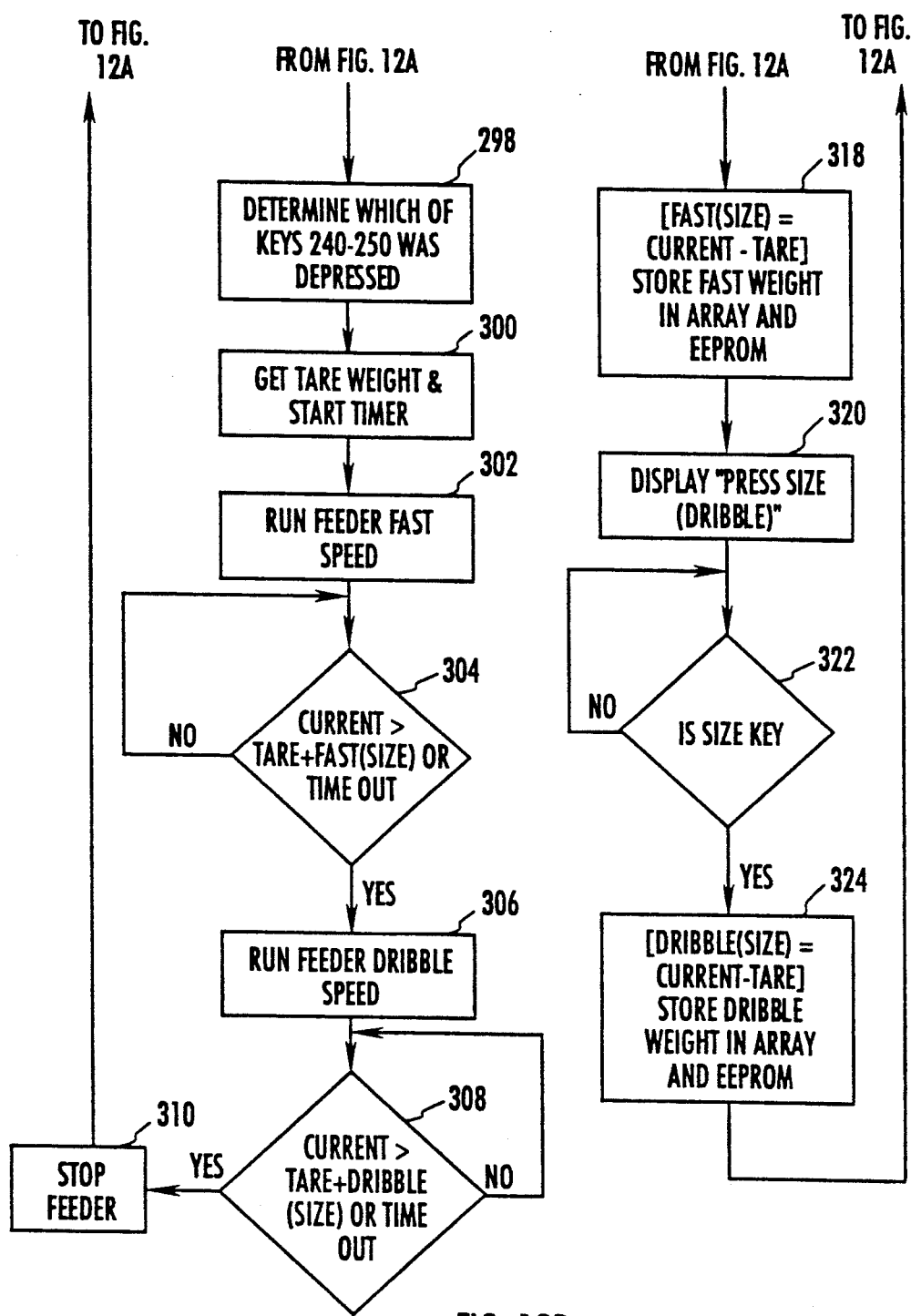

FIGS. 12A and 12B represent a flow chart generally illustrating the sequence of program steps which processor 270 carries out upon start up (step 280). In step 282, LCD display 278 is initialized in a conventional manner, and in step 284 the set point values are read from EEPROM 276. EEPROM 276 stores set point values which include a first FAST (SIZE) value and a first DRIBBLE (SIZE) value for each of keys 240-250 (six sets of values). The set point values also include a second FAST (SIZE) value and a second DRIBBLE (SIZE) value for each of keys 240-250 (six sets of values). This arrangement provides 12 sets of set point values selectable with only seven (7) keys (240-250 and 251).

In step 286, a modify flag is checked. If the modify flag is set, display 278 displays the "PRESS MOD SIZE" message, and if the modify flag is not set, display 278 is driven to display the "PRESS SIZE" message. In step 292, keys 240-250, 245 and 251 are monitored until a key is pressed. When a key is pressed, the key is checked to determine if the key is FUNC1 key 245 (step 294), FUNC2 key 251 (step 296) or one of keys 240-250 (step 298).

When FUNC1 key 245 is depressed, a set of program steps including steps 312, 314, 316, 318, 320, 322 and 324 are executed. These steps allow the user to set the first and second FAST (SIZE) and DRIBBLE (SIZE) values associated with each of keys 240-250. More specifically, at step 312, the weight value from load cell 184 is sampled and this value is stored as the tare weight. Additionally, the message "PRESS SIZE (FAST)" is displayed upon display 278. Next, the keys of function control 24 are checked for depression, and checked to determine which of keys 240-250 were depressed (steps 314 and 316). When a size key 240-250 is depressed, a FAST (SIZE) value is calculated and stored for the weight value associated with the weight of the material in containers 19 (step 318). In particular, a calibration weight value of choice is placed upon containers 19, a current weight value at load cell 184 is sampled, and the FAST (SIZE) value is calculated as the value sampled from load cell 184 less the tare weight value from step 312. This FAST (SIZE) value is then stored in EEPROM 276 (step 318).

After storing the FAST (SIZE) value in EEPROM 276, the message "PRESS SIZE (DRIBBLE)" is displayed upon display 278. Next, keys 240-250 of function control 24 are monitored to determine which of these size keys are pressed (step 322). Upon depression of one of size keys 240-250, a DRIBBLE (SIZE) value is calculated and stored in EEPROM for that particular key (step 324). In particular, to calculate the DRIBBLE (SIZE) value, a calibration weight value is placed in containers 19 and a current weight value from load cell 184 is sampled. Subsequently, the tare weight value sampled at step 312 is subtracted from the current weight value, with the difference being the DRIBBLE (SIZE) value for the particular size key 240-250 depressed. This DRIBBLE (SIZE) value is then stored in EEPROM 276. Upon completion of step 324, a return is made to step 286.

If FUNC2 key 251 is depressed (step 296), the addressing of EEPROM 276 is shifted such that either the first or second FAST (SIZE) and DRIBBLE (SIZE) values are addressed by keys 240-250, depending upon which values were addressed prior to the shift in addressing of EEPROM 276.

Where neither FUNC1 key 245 nor FUNC2 key 251 are depressed, a determination as to which of keys 240-250 was depressed is made (step 298). Upon determining which of keys 240-250 was depressed, the weight value from load cell 184 is sampled and a start timer counter is set (step 300). Next, processor 270 drives D/A 274 such that motor drive 22 drives arrangement 26 at the fast speed so that material feeder 16 feeds at its maximum rate. In step 304, the current weight value which is sampled from load cell 184 is compared to the sum of the tare weight value sampled at step 300 and the FAST (SIZE) value for the particular key 240-250 depressed. Additionally, the start timer counter is checked to ensure that the counter has not timed out. Upon either the current weight value, as sampled from load cell 184, exceeding the sum, or the counter timing out, processor 270 drives D/A 274 such that motor drive 22 drives arrangement 26 and feeder 16 feeds material at a reduced rate to prevent overshoot of the amount of material applied to containers 19 (step 306).

In step 308, the current weight value is continuously sampled from load cell 184. The current weight value is compared against the sum of the tare weight value and the DRIBBLE (SIZE) value associated with the particular key 240-250 depressed. Additionally, in step 308, the start timer counter is sampled to detect a time out. In the event of the current weight value being greater than the sum or time out of the counter, arrangement 26 is stopped such that feeder 16 ceases dispensing material (step 310). In steps 304 and 308, the start timer counter is sampled and provided so that in the event of an error, or malfunction of the sampling process of load cell 184, feeder 16 is not driven indefinitely, whereby all of the material in feeder 16 is dispensed, regardless of the weight at container 19.

It will be understood that the above description is of the preferred exemplary embodiment of the invention, and that the invention is not limited to the specific form shown. For example, weight values sampled from load cell 184 may be a single weight value or derived from a group of weight values (average) to avoid the effects of a spurious single value. Various other substitutions, modifications, changes and omissions may be made in the design and arrangement of the elements of the preferred embodiment without departing from the spirit of the invention as expressed in the appended claims.

What is claimed is:

1. An apparatus for dispensing a flowable material, comprising:
   a feeder including a hopper having two substantially parallel, substantial vertical sidewalls, a bottom extending between the sidewalls, first and second elongated and parallel feed screws extending from a third sidewall, and means for rotably supporting the feed screws at the third sidewall;
   a feed screw drive mechanically coupled to the first and second feed screws and configured to move the material toward ducts in a fourth sidewall;
   an enclosure including a plurality of walls defining an interior space, where the feeder is located within the interior space; and
   a refrigeration unit disposed adjacent to the enclosure to maintain the interior space at a selected temperature.

2. The apparatus of claim 1, further comprising:
   a drive unit located at the exterior of the enclosure; and
   means, extending from the exterior to the interior of the enclosure, for removably coupling the feed screw drive to the drive unit, where the feeder is removable from the enclosure and the drive unit imparts rotational motion to the feed screw drive.

3. An apparatus for dispensing a flowable material comprising:
   a feeder having a first substantially vertical sidewall, a bottom fixed to the sidewall, first and second feed screws, and means for rotatably supporting the feed screws adjacent to the bottom;
   a feed screw drive mechanically coupled to the feed screws;
   an enclosure including a plurality of walls defining an interior space, where the feeder is supported within the interior space;
   a refrigeration unit disposed adjacent to the enclosure to cool the interior space;
   a drive unit located at the exterior of the enclosure;
   means, extending from the exterior to the interior of the enclosure, for removably coupling the feed screw drive to the drive unit including a clutch for connecting and disconnecting the feed screw drive from the drive unit, where the drive unit imparts rotational motion to the feed screw drive; and
   cooperating guide rails and channels for mounting the feeder on a bottom surface of the enclosure.

4. An apparatus for dispensing a flowable material comprising:
   a feeder having a first substantially vertical sidewall, a bottom fixed to the sidewall, first and second feed screws, and means for rotatably supporting the feed screws adjacent to the bottom;
   a feed screw drive mechanically coupled to the feed screws;
   an enclosure including a plurality of walls defining an interior space, where the feeder is supported within the interior space;
   a refrigeration unit disposed adjacent to the enclosure to cool the interior space;
   a drive unit located at the exterior of the enclosure;
   means, extending from the exterior to the interior of the enclosure, for removably coupling the feed screw drive to the drive unit including a clutch for connecting and disconnecting the feed screw drive from the drive unit, where the drive unit imparts rotational motion to the feed screw drive;
   second, third and fourth substantially vertical sidewalls, where each sidewall is joined to the adjacent sidewalls at substantially right angles such that the first and second sidewalls are substantially parallel, the bottom extends between the sidewalls and the means for rotatably supporting supports the feed screws at the second sidewall;
   first, second, third and fourth feed screw ducts extending from the first sidewall adjacent the bottom; and
   third and fourth feed screws, where end portions of the first, second, third and fourth feed screws are located in the first, second third and fourth feed screw ducts, respectively, the feed screws are located adjacent the bottom, the first feed screw is located adjacent the third sidewall, the second feed screw is located adjacent the first feed screw, the fourth feed screw is located adjacent the fourth sidewall and the third feed screw is located adjacent the fourth feed screw;
   the feed screw drive being coupled to the feed screws such that the first and second feed screws rotate in opposite directions and the third and fourth feed screws rotate in opposite directions.

5. An apparatus for dispensing a flowable material, comprising:
   a feeder including a hopper for holding the flowable material and a feed screw positioned near the bottom of the hopper for feeding the material out through an outlet opening in the hopper;
   a thermally insulated enclosure having an interior space containing the feeder, the enclosure comprising an access opening and a door over the access opening to permit access to the inner space of the enclosure;
   a drive motor disposed outside of the insulated enclosure;
   a feed screw drive mechanism for rotating the feed screw in response to actuation of the drive motor, including a coupling for connecting and disconnecting the feed screw from the feed screw drive mechanism; and
   a refrigeration unit disposed adjacent to the enclosure to maintain the interior space of the enclosure at a selected temperature;
   wherein the feeder and a bottom surface of the enclosure have cooperating guide rails and channels for mounting the feeder on the bottom of the enclosure.

* * * * *

UNITED STATES PATENT AND TRADEMARK OFFICE
CERTIFICATE OF CORRECTION

PATENT NO. : 5,316,195

DATED : May 31, 1994

INVENTOR(S) : Moksnes et al.

It is certified that error appears in the above-indentified patent and that said Letters Patent is hereby corrected as shown below:

On the title page, item [54] and column 1, line 2, change "FLAVORABLE" to --FLOWABLE--.

<u>IN THE DRAWINGS</u>

Figure 4, sheet 4, reference numeral "112" should read --122--.

Figure 7, sheet 6, numeral "236" referring to the two bolts should read --230--.

In column 4, line 27, reference numeral "48" should read --46--.

In column 6, line 5, reference numeral "11" should read --110--.

In column 6, line 48, reference numeral "142" should read --132--.

In column 7, line 31, delete the word "is".

In column 7, lines 37 and 39, replace reference numeral "150" with --152--.

In column 8, line 20, the word "inserted" should read --insert--.

In column 9, line 13, reference numeral "168" should read --160--.

UNITED STATES PATENT AND TRADEMARK OFFICE
CERTIFICATE OF CORRECTION

PATENT NO. : 5,316,195
DATED : May 31, 1994
INVENTOR(S) : Moksnes et al.

It is certified that error appears in the above-indentified patent and that said Letters Patent is hereby corrected as shown below:

In column 11, line 37, "FUNCI" should read --FUNC1--.

In column 12, line 41, reference numeral "26" should read --22--.

In column 13, line 53, "FUNCI" should read --FUNC1--.

In column 14, line 32, "FUNCI" should read --FUNC1--.

In column 15, line 17, the word "substantial" should read --substantially--.

In column 15, line 20, "rotably" should read --rotatably--.

In column 16, line 22, delete the word "supports".

In column 16, line 29, insert --,-- after "second".

Signed and Sealed this

Thirteenth Day of September, 1994

Attest:

BRUCE LEHMAN

Attesting Officer     Commissioner of Patents and Trademarks